United States Patent
Pannala et al.

(10) Patent No.: US 12,390,786 B2
(45) Date of Patent: *Aug. 19, 2025

(54) METHOD AND REACTOR FOR CONVERSION OF HYDROCARBONS

(71) Applicant: SABIC Global Technologies B.V., Bergen op Zoom (NL)

(72) Inventors: Sreekanth Pannala, Houston, TX (US); Arno Johannes Maria Oprins, Houston, TX (US); Lei Chen, Houston, TX (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 211 days.

This patent is subject to a terminal disclaimer.

(21) Appl. No.: 18/004,027

(22) PCT Filed: Jul. 6, 2021

(86) PCT No.: PCT/US2021/040414
§ 371 (c)(1),
(2) Date: Dec. 30, 2022

(87) PCT Pub. No.: WO2022/010823
PCT Pub. Date: Jan. 13, 2022

(65) Prior Publication Data
US 2023/0302425 A1    Sep. 28, 2023

Related U.S. Application Data

(60) Provisional application No. 63/048,210, filed on Jul. 6, 2020.

(51) Int. Cl.
*B01J 19/24*    (2006.01)
*B01J 4/00*    (2006.01)
(Continued)

(52) U.S. Cl.
CPC ............ *B01J 19/2405* (2013.01); *B01J 4/001* (2013.01); *B01J 19/246* (2013.01); *C10G 9/36* (2013.01);
(Continued)

(58) Field of Classification Search
CPC ...... B01J 19/2405; B01J 4/001; B01J 19/246; B01J 4/002; B01J 19/24; C10G 9/36
See application file for complete search history.

(56) References Cited

U.S. PATENT DOCUMENTS

| 2,823,243 A | 2/1958 | Robinson |
| 3,437,714 A | 4/1969 | Newman |

(Continued)

FOREIGN PATENT DOCUMENTS

| CA | 2555299 C | 4/2014 |
| CN | 2237640 Y | 10/1996 |

(Continued)

OTHER PUBLICATIONS

Gruber, M.R. et al., "Mixing and Penetration Studies of Sonic Jets in a Mach 2 Freestream", Journal of Propulsion and Power, vol. 11, No. 2, Mar.-Apr. 1995, pp. 315-323. (Year: 1995).*

(Continued)

*Primary Examiner* — Renee Robinson
(74) *Attorney, Agent, or Firm* — Fish & Richardson P.C.

(57) ABSTRACT

A reactor and method for the conversion of hydrocarbon gases utilizes a reactor (12, 312, 412, 512, 612) having a unique feed assembly with an original vortex combustion chamber (40, 340, 436, 536, 636), a diverging conduit (48, 348, 448, 548, 648), and a cylindrical reactor chamber (40, 340, 436, 536, 636). This design creates a compact reaction zone and an inwardly swirling fluid flow pattern of the feed gases to form a swirling gas mixture that passes through a diverging conduit (48, 348, 448, 548, 648). The feed streams (Continued)

can be introduced into the reactor (12, 312, 412, 512, 612) at any angle (radial, axial, or something between, or a combination of the above forms) with swirling flow components. The feed streams comprise preheated steam and hydrocarbons for cracking. This system provides conditions suitable for efficient cracking of hydrocarbons, such as ethane, to form olefins.

16 Claims, 8 Drawing Sheets

(51) Int. Cl.
   *C10G 9/36* (2006.01)
   *C10G 47/22* (2006.01)
   *C10G 47/32* (2006.01)
(52) U.S. Cl.
   CPC .............. *C10G 47/22* (2013.01); *C10G 47/32* (2013.01); *B01J 4/002* (2013.01); *C10G 2300/1081* (2013.01); *C10G 2400/20* (2013.01)

(56) References Cited

U.S. PATENT DOCUMENTS

| | | | |
|---|---|---|---|
| 4,097,544 | A | 6/1978 | Hengstebeck |
| 5,789,644 | A | 8/1998 | Passler et al. |
| 6,083,425 | A | 7/2000 | Clawson et al. |
| 6,274,113 | B1 | 8/2001 | Heyse et al. |
| 9,327,260 | B2 | 5/2016 | Davis et al. |
| 10,478,840 | B2 | 11/2019 | Khan et al. |
| 11,020,719 | B2 | 6/2021 | Pannala et al. |
| 2009/0272821 | A1 | 11/2009 | Guo et al. |
| 2010/0126176 | A1* | 5/2010 | Kim ................... F23R 3/14 239/399 |
| 2010/0285413 | A1 | 11/2010 | Borissov |
| 2014/0110307 | A1 | 4/2014 | Salazar-Guillen et al. |
| 2015/0165414 | A1* | 6/2015 | Gattupalli .............. B01J 12/005 585/536 |
| 2019/0127295 | A1 | 5/2019 | Pannala et al. |

FOREIGN PATENT DOCUMENTS

| | | |
|---|---|---|
| EP | 0593171 A1 | 4/1994 |
| GB | 834419 A | 5/1960 |
| GB | 840664 A | 7/1960 |
| GB | 910623 A | 11/1962 |
| GB | 1174870 A | 12/1969 |
| GB | 2353802 B | 8/2002 |
| WO | 2019173570 A1 | 9/2019 |
| WO | 2020086681 A2 | 4/2020 |
| WO | WO 2022010822 | 1/2022 |

OTHER PUBLICATIONS

Naumov et al. "Multi-cellular pattern of a two-fluid swirling flow in a closed cylinder", Journal of Physics: Conference Series, vol. 1105, Dec. 12, 2018, pp. 1-6, 6 Pages.

Naumov et al. "Hysteresis in a swirling two-fluid flow", Journal of Physics: Conference Series, vol. 899, Sep. 27, 2017, pp. 1-6, 6 Pages.

Shtern et al., "Effect of swirl decay on vortex breakdown in a confined steady axisymmetric flow", Physics of Fluids, Apr. 23, 2012, vol. 24, pp. 1-14, 14 Pages.

Shtern et al. "Hysteresis and precession of a swirling jet normal to a wall", Physical Review E: Statistical, Nonlinear, and Soft Matter Physics, vol. 69, Jan. 30, 2004, pp. 1-11, 11 Pages.

Shtern et al. "Hysteresis in swirling jets", Journal of Fluid Mechanics, vol. 309, Feb. 25, 1996, pp. 1-44, 44 Pages.

Shtern et al. "Hysteresis in a swirling jet as a model tornado", Physics of Fluids A: Fluid Dynamics, vol. 5, Sep. 1, 1993, pp. 2183-2195, 13 Pages.

Foreign communication from related application—International Search Report and Written Opinion dated Oct. 20, 2021 for application No. PCT/US2021/40414 filed on Jul. 6, 2021, 14 pages.

Foreign communication from related application—International Preliminary Report on Patentability dated Jan. 10, 2023 for application No. PCT/US2021/40414 filed on Jul. 6, 2021, 7 pages.

* cited by examiner

METHOD AND REACTOR FOR CONVERSION OF HYDROCARBONS

CROSS-REFERENCE TO RELATED APPLICATIONS

This application is a National Stage Application under 35 U.S.C. § 371 and claims the benefit of International Application No. PCT/US2021/040414, filed Jul. 6, 2021, which claims the benefit of priority of U.S. Application No. 63/048,210, filed Jul. 6, 2020, the entirety of both of which are incorporated herein by reference.

TECHNICAL FIELD

The disclosure relates to conversion methods for converting a variety of hydrocarbons to produce more valuable products and the reactor designs for such conversion.

BACKGROUND

Conventional steam crackers are the industry go-to reactors to break long-chain hydrocarbons and modify smaller alkanes (i.e., naphtha, butane, or ethane) into smaller molecules and olefins, such as ethylene and propylene. Examples of such crackers are described in Canadian Patent No. 2555299C and U.S. Pat. Nos. 3,437,714; 4,097,544; and 9,327,260. In such crackers, heavy gases such as naphtha, liquefied petroleum gas (LPG), propane, butane, and ethane are fed into a furnace with steam and converted into smaller olefins. Steam is added to the process to increase the selectivity to olefins with reasonable conversion. Typically, this process operates at high temperatures (i.e., from 750° C. to 900° C.) and have residence times of around 100 to 500 milliseconds. This process has been optimized over the last five decades but there are still significant disadvantages. These include heat losses and complexity associated with separate exothermic (combustion in the furnace) and endothermic steps (cracking in the process tubes). The presence of inert compounds in the combustion and process side also affects the overall efficiency. Metallurgical limitations of the reactors also limit the temperatures that can be used. Ideally, higher temperatures with shorter contact times result in better selectivity and conversion to smaller olefins. Plugging from coking also occurs in these conventional processes, which can increase the capital cost and operational expenses. There is also a lack of feedstock flexibility, as commercial crackers are typically optimized for only a certain type of feedstock.

One solution to these challenges is an ANJEVOC reactor system. The basic ANJEVOC (ANnular JEt VOrtex Chamber) system is disclosed in U.S. Pat. No. 11,020,719, which is incorporated by reference herein for all purposes. U.S. Pat. No. 11,020,719 describes a reactor system that can be used in the pyrolysis conversion of hydrocarbon gases. The ANJEVOC reactor may also be used for cracking, with a somewhat different configuration, referred to as "ANJEVOC-C" the extra "C" for cracking. This cracking system is described in International Publication No. WO2020/086681A2, which is incorporated by reference herein for all purposes.

The disclosure addresses significant changes and improvements in the ANJEVOC-C system.

SUMMARY

The present disclosure primarily uses thermal energy from preheated heated gas to generate the necessary reactions in the reactor. The inlet flows of heated gas and hydrocarbons to be cracked may be partially or completely axial to the central longitudinal axis of the reactor, partially or completely perpendicular to the axis, or some combination thereof, with at least one stream having a certain axial-to-radial velocity ratio, thereby forming a swirling flow in the mixing feed streams. Such a design has many advantages, including intensive turbulent mixing and short mixing time scale leading to high ethylene selectivity, and the heated gas can be condensed out of the outlet stream, which significantly simplifies the downstream separations. If the energy input to the preheating of the heated gas is primarily derived from renewable sources, the $CO_2$ footprint of this reactor could be extremely small.

In a preferred embodiment, a reactor system for the conversion of hydrocarbons is taught, the system comprising a reactor vessel having a reactor wall that defines a reaction chamber, the reaction chamber having a central longitudinal axis, the reactor vessel having upstream and downstream ends, a diverging conduit having upstream and downstream ends, the circumferential wall expanding in width from the upstream to the downstream ends of the diverging conduit, the downstream end of the diverging conduit being in fluid communication with the reaction chamber of the reactor, a feed assembly having upstream and downstream ends, the downstream end of the feed assembly being operably coupled to the upstream end of the diverging conduit, with the central longitudinal axis passing through the feed assembly, the feed assembly comprising at least two flow inlets, wherein the two flow inlets provide a flow path for at least one each for heated gas and hydrocarbons, respectively. Further, the heated gas and hydrocarbon enter through their respective flow inlets, and mix together as they flow from the feed assembly through the diverging conduit and into the reaction chamber in a swirling mixture. The heated gas is preheated before entering the flow inlet. The heat required for cracking the hydrocarbon in the reaction chamber primarily comes from the preheated heated gas. And finally, the reaction in the reaction chamber creates an exit stream comprising heated gas, hydrocarbon, and reaction products.

In another embodiment, all the flow inlets cause their respective feed streams to enter the reactor in a direction that is approximately perpendicular to the central axis, with at least one stream having a certain tangential-to-radial velocity ratio creating a swirling flow in the mixing feed streams.

In another embodiment, all the flow inlets cause their respective feed streams to enter the reactor in a direction that is approximately axial to the central axis, with at least one stream having a certain tangential-to-axial velocity ratio forming a swirling flow in the mixing feed streams.

In another embodiment, at least one flow inlet causes its respective feed stream to enter the reactor in a direction that is approximately axial to the central longitudinal axis, and at least one inlet flow space causes its respective feed stream to enter the reactor in a direction that is approximately perpendicular to the central longitudinal axis, with at least one feed stream having a tangential-to-axial or tangential-to-radial velocity component to form a swirling flow for mixing in the mixing feed streams.

In another embodiment, the feed assembly further comprises guide vanes, the guide vanes being movable to selected positions to provide selected tangential-to-axial or tangential-to-radial velocity ratios of feed streams for mixing in the mixing feed streams.

In another embodiment, the reaction chamber further comprises an outlet, through which the heated gas, hydrocarbons and reaction products exit the reaction chamber.

In another embodiment, after the heated gas, hydrocarbon and reaction products exit the reaction chamber, the heated gas is separated from the rest of the exit stream.

In another embodiment, the separated heated gas is recycled back to the front of the reactor system.

In another embodiment, the heated gas is preheated via renewable energy sources.

In another embodiment, at least one of the feed inlets is an atomizer, the atomizer providing a flow path for the hydrocarbon.

In another embodiment, the feed stream coming in via the atomizer is naphtha, crude oil, pyoil (from hydrocarbons, biomass, or plastic waste), or NGL in liquid phase.

In another embodiment, the reaction chamber has an outer wall, and wherein the selection and placement of the one or more flow inlets allows one to control the placement of the hydrocarbon with respect to the heated gas, the placement creating a relatively cooler space in the interior of the reactor.

In another embodiment, the hydrocarbon first enters the reactor closest to the outer wall of the reactor, and then moves radially inward to interact with the heated gas.

In another embodiment, the hydrocarbon first enters the reactor closest to the central longitudinal axis of the reactor, and then moves radially outward to interact with the heated gas.

In another embodiment, the reactor system further comprises a converging conduit, the converging conduit having an upstream and downstream end, the central longitudinal axis passing through the converging conduit, the converging conduit being connected to the upstream end of the diverging conduit, and the upstream end of the feed assembly.

In another embodiment, the converging conduit and the diverging conduit together comprise a venturi.

In another embodiment, the swirl atomizer may or may not help induce swirling in the mixing feed streams.

In another embodiment, the heated gas is steam. And in another embodiment, any of the feed steams contain impurities.

BRIEF DESCRIPTION OF THE DRAWINGS

For a more complete understanding of the embodiments described herein, and the advantages thereof, reference is now made to the following descriptions taken in conjunction with the accompanying figures, in which.

DETAILED DESCRIPTION

In the present disclosure, a novel system is utilized that converts hydrocarbons to higher value products, such as olefins, by utilizing high centrifugal forces in a unique reactor configuration to create and control a reacting flow environment that maximizes the production of desirable olefins with very high productivity (cracking). This is achieved by utilizing annular highly swirled jets of feed gases where hydrocarbons and preheated steam are mixed to crack the hydrocarbons. In one embodiment, the cracking reactor used can be similar to the pyrolysis reactor described in International Publication No. WO2020/086681A2, which is incorporated by reference herein for all purposes. International Publication No. WO2020/086681A2 describes a reactor that can be used in the pyrolysis cracking of hydrocarbon gases. This type of reactor may be referred to as an ANJEVOC-C (ANnular JEt VOrtex Chamber-Cracking) reactor.

Figure 1:
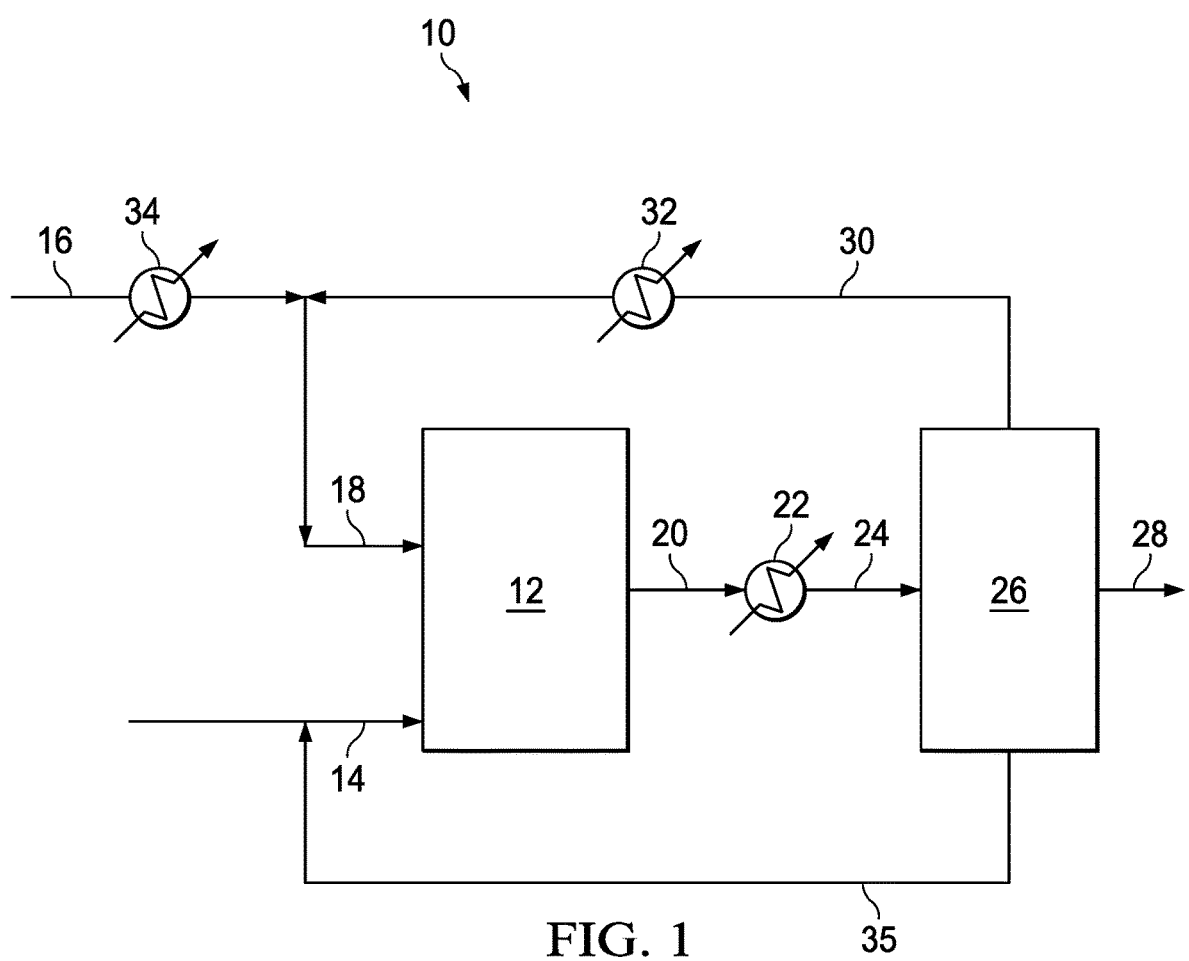
FIG. 1 is a process flow diagram of a cracking system for cracking of hydrocarbons into cracked hydrocarbon products in accordance with particular embodiments of the disclosure.

Referring to FIG. 1, a flow schematic of a hydrocarbon conversion system 10 is shown for the conversion of hydrocarbons to higher value products, such as olefins. The system 10 includes an ANJEVOC-C cracking reactor 12, which is described in more detail later on. A cracking feed 14 is fed to the reactor 12 as a separate stream. The cracking feed 14 can include hydrocarbons such as ethane, liquefied petroleum gas (LPG), butane, natural gas liquid (NGL), natural gas, light gas oils, and/or heavy gas oils, or a blend of these hydrocarbons. The cracking feed stream 14 may be preheated prior to being introduced into the reactor 12. In particular applications, the feed stream 14 may be heated to a temperature of from 25° C. to 500° C. to improve conversion efficiency or vaporize heavier liquid hydrocarbons either externally or within the reactor.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range.

A feed stream containing a heated gas is also fed to the reactor 12 as a separate stream 18. In some embodiments, the heated gas is steam, and in such instances the feed stream would be a steam feed stream 18. For purposes of discussion, steam will be used as an illustrative example of a possible heated gas, but any other heated gas would also work just as well, and the use of steam in this discussion is not meant in any way to be a limitation of the disclosure.

The steam feed stream 18 is preheated to a sufficient temperature to allow cracking of the cracking feed stream 14, once the two are mixed in the reactor 12. The steam feed stream 18 will include both recycled steam 30 coming back from the exit of the separator, as well as make-up steam 16 coming from another source. The volume ratio of steam and cracking feed 14 is preferably optimized to achieve at least 1500 K after fully mixing, ensuring enough thermal energy for the endothermic cracking reactions.

Cracked reaction products 20 are removed from the reactor 12 where they may be cooled by quenching in a quenching unit 22, such as a water-droplet-spray quench vessel, or other suitable gas quench devices. The cracked products 20 will typically be a mixture of ethane, ethylene, acetylene, methane, hydrogen gas, steam, water, oxygenates, some heavies (>C4), some aromatics, and product olefins.

The quenched cracked reaction products 24 may be delivered to a separation unit 26, where the condensed water and steam are separated out for recycling in a recycle stream 30. Another recycle stream of unreacted products 35 is also removed and sent back to a point ahead of the reactor to mix with the hydrocarbon feed 14. Finally, the remaining portions of the product stream 28 containing product olefins, such as ethylene ($C_2H_4$), acetylene ($C_2H_2$), propylene ($C_3H_6$), and others, continue onward for further processing.

The separated water and steam stream 30 is removed from the separator 26 and passed through another heat exchanger 32 to convert any water to steam and then heat the steam up to cracking temperatures. One or more heat exchangers 32 may be used to achieve the desired temperatures. The recycled steam stream 32 then mixes with any additional needed new steam via make-up steam stream 16, the make-up steam stream heated by another heat exchanger 34, to create an appropriate ratio of steam to hydrocarbon, prior to entry into the reactor. The heat exchanger(s) may instead be utilized after the two steam streams have mixed, or some combination thereof.

The ratio of hydrocarbons to steam depends on the preheating temperature of these two streams. The goal is to reach a temperature in the range of 1500 K to 2000 K after fully mixing to ensure acceptable once-through conversion. If the temperature is too low, the conversion will be low, while if the temperature is too high, selectivity of $C_2H_2$ will be reduced. The steam feed stream is mainly used as a thermal carrier to crack hydrocarbon feed, while the reaction between steam and hydrocarbon is minimum. Therefore, the make-up stream is a small portion of the recycled steam stream.

It should be noted that while the system 10 of FIG. 1 shows single units for the various process steps, each unit could be composed of one or more units that may operate in conjunction with one another, such as in parallel or sequentially, to carry out the various process steps described.

Figure 2:
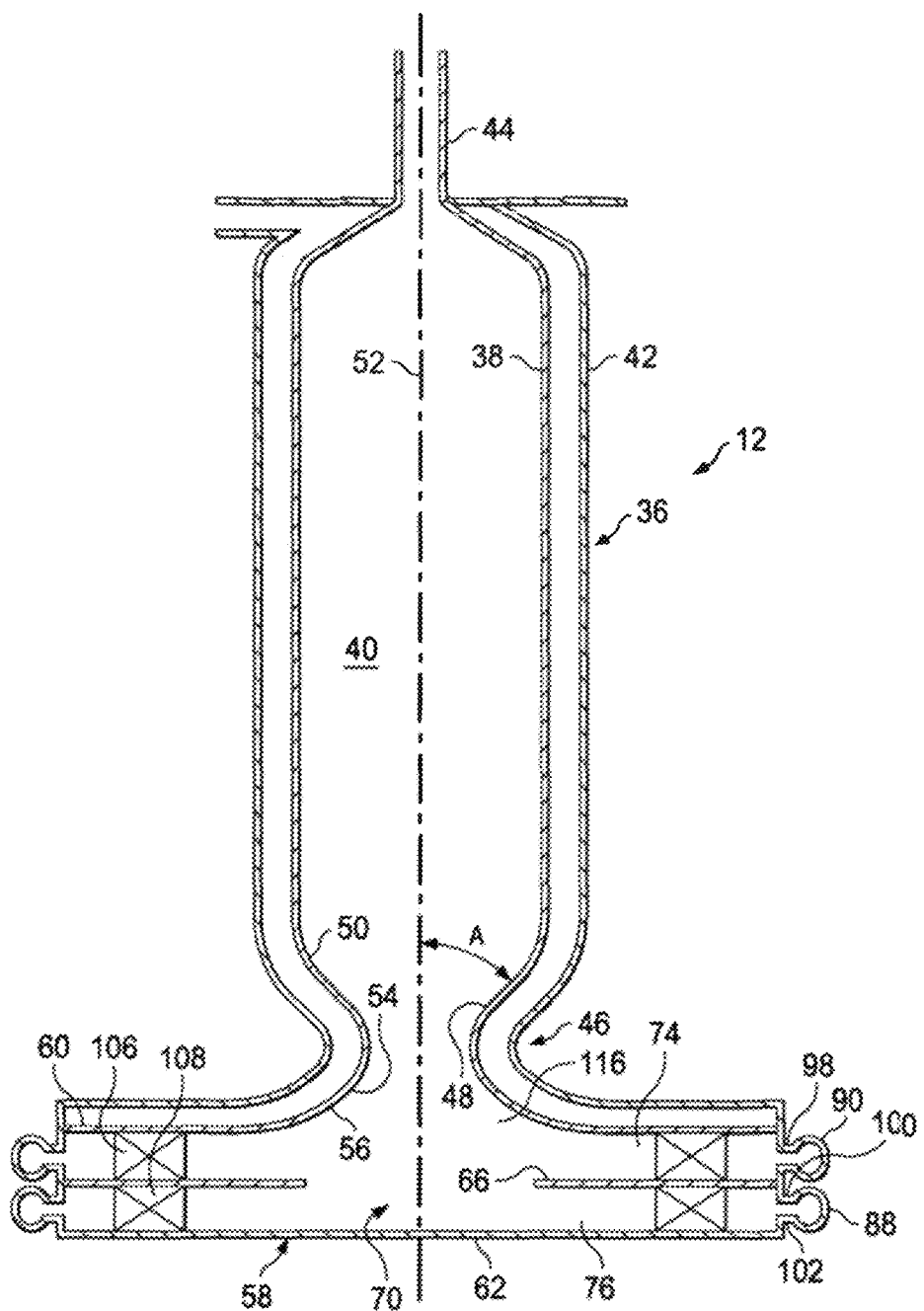
FIG. 2 is a schematic representation of an embodiment of the reactor system for cracking shown in cross section.

Referring to FIG. 2, an elevational cross-sectional schematic representation of the cracking reactor system 12 for cracking of hydrocarbons, such as ethane, LPG, butane, naphtha, natural gas, light gas oils, heavy gas oils, or a combination of these hydrocarbons, is shown. The reactor 12 constitutes an ANJEVOC-C reactor and includes a reactor vessel 36 having a reactor wall 38 that defines an interior reaction chamber 40. The reactor wall 38 may have a cylindrical configuration with a constant diameter along all or a portion of its length, which may constitute a majority of its length. In most instances, the reactor 12 is oriented vertically so that the cylindrical reactor wall 38 is oriented in an upright orientation. The reactor can have other orientations (e.g., horizontal, sloped), however, because the process is controlled by the centrifugal force, which exceeds the gravitational force by several orders of magnitude. The reactor vessel 36 may be configured to provide a length to diameter ratio (L/D) of at least 2. In particular applications, the L/D ratio may range from 2-10.

The reactor vessel 36 may be formed from steel. In certain embodiments, a cooling jacket can be provided around the reactor vessel, wherein a second steel wall 42 is positioned around and spaced from the inner reactor wall 38 and a cooling fluid, such as water may be circulated through the jacket formed between the walls 38, 42. In other embodiments, the reactor wall 38 may be formed from one or more layers of refractory material that line the interior of an outer steel wall to reduce heat loss and sustain the high temperatures of the reactor 12. As will be described later on, because of the unique design and operation of the reactor 12, the reactor wall 38 is cooled internally by the high-velocity near-wall gas flow pushed by centrifugal forces against the reactor wall 38 so that in some applications no exterior cooling jacket is required. This also allows refractory materials to be used for the interior of the reactor wall 38. Further, as no oxygen or oxygen-based fuel is used, the peak temperatures will not exceed 2000 K.

An outlet 44 is provided at the upper or downstream end of the reactor vessel 36 for removing or discharging cracked products from the reaction chamber 40. Although the outlet 44 is shown located at the upper end of the reactor vessel 36, in other embodiments it may be located at the lower end of the reactor vessel 36, so that the flow through the reactor is in the opposite direction (i.e., from top to bottom). The outlet diameter can be same as the diameter of the reactor wall 38 or the outlet diameter may be reduced to accelerate the flow before quenching and collection downstream.

The reactor 12 includes a reactor inlet assembly 46 that is coupled or joined to the lower or upstream end of the reactor wall 38 of the reactor vessel 36. The inlet assembly 46 has a diverging conduit 48 with a circumferential wall 50 that surrounds a central longitudinal axis 52 of the reactor. Where the reactor 12 is oriented vertically, the central axis 52 will also be oriented vertically as well and will be concentric with or parallel to a central vertical axis of the reactor vessel 36. In the embodiment shown, the axis 52 is concentric with and aligned with the central longitudinal axis of the reactor vessel 36. The circumferential wall 50 extends from opposite upstream and downstream ends of the diverging conduit 48. As used herein, the terms "upstream" and "downstream" or similar expressions with respect to describing various components of the reactor system 12 shall refer to the position of the component with respect to the direction of overall fluid flow through the reactor 12 along the central axis 52. A converging conduit 54 having an upstream and downstream end, with the central longitudinal axis 52 passing through the converging conduit 54, is connected to the upstream end of the diverging conduit 48, and the upstream end of the feed or reactor inlet assembly 46 to form a venturi. As can be seen in FIG. 2, the circumferential wall 50 smoothly expands in width or diameter from the upstream end to the downstream end of the diverging conduit 48. The interior of the circumferential wall 50 may have a circular perpendicular transverse cross section (with respect to the axis 52) along its length. The circumferential wall 50 defines an interior flow path of the inlet assembly 46.

The diverging conduit 48, as well as the other diverging conduits described herein, is configured for non-supersonic fluid flow. Conduits or nozzles configured for supersonic flow, such as de Laval nozzles, are configured differently from the conduit 48 to provide supersonic flow downstream to form a shockwave. The diverging conduit 48 does not form such supersonic flow or shockwave. Instead, the conduit 48 has a geometry that facilitates a recirculation and backflow of gases within the interior reaction chamber 40 near the central longitudinal axis 52 in combination with annular swirling jet gas flow adjacent to the inner reactor wall 38. As such, the diverging conduit 48 will have a greater angle of divergence than the angle of divergence typically utilized in de Laval nozzles (e.g., 15° or less). In, certain embodiments, the overall angle of divergence "A" (FIG. 2) relative to the axis 52 may be from 25° or more. In particular instances, the angle of divergence A for the diverging conduits discussed herein is from 25° to 55°. In some embodiments, the angle of divergence A is of from at least, equal to, and/or between any two of 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, and 55°. The large divergence angle does not lead to recirculation of the flow at the walls as in this unique design the upstream swirling flow is coupled with the convergent divergent nozzle.

The downstream end of the diverging conduit 48 or converging conduit 54 joins the reactor wall 38 around its perimeter so that the diverging conduit 48 is in fluid communication with the reactor chamber 40 of the cracking reactor vessel 36. The upstream end of the diverging conduit 48 forms a reactor inlet 56 of the reactor vessel 36.

A reactor feed assembly 58 is provided with the reactor 12. The reactor feed assembly 58 is in fluid communication with the reactor inlet 56 of the inlet assembly 46, with the central axis 52 passing through the reactor feed assembly 58. The feed assembly 58 includes a downstream feed assembly wall 60 that extends circumferentially around and joins the upstream end of the reactor inlet 56. The feed assembly wall 60 is oriented perpendicular or substantially perpendicular (i.e., ≤5 degrees from perpendicular about its circumference) to the central axis 52.

Axially spaced upstream from the downstream wall 60 along the central axis 52 is an upstream feed assembly wall 62. The upstream wall 62 is perpendicular to or substantially perpendicular (i.e., ≤5 degrees from perpendicular about its circumference as it extends from the central axis) to the central axis 52 and extends across the central axis 52.

A gas partition wall 66 is axially spaced between the downstream and upstream feed assembly walls 60, 62. The partition wall 66 is also oriented perpendicular to or substantially perpendicular (i.e., ≤5 degrees from perpendicular about its circumference as it extends from the central axis) to the central axis 52, having a central opening 70 that surrounds the central axis 52 and is concentric with the diverging conduit 48. The central opening 70 has a circular configuration. Other shapes for the central opening 70 (e.g., oval) may also be used provided such configuration facilitates the swirling of gases to provide the required flow patterns described herein. This shape may also correspond to the cross-sectional shape of the circumferential wall 50 of the diverging conduit 48. In most applications, however, the central opening 70 will be circular in shape. The central opening 70 may have a diameter or width that is the same or slightly different (i.e., greater or smaller) than the diameter or width of the diverging conduit 48 at its narrowest point.

An annular gas flow space 74 is defined by the downstream side of the downstream partition wall 66 and the downstream feed assembly wall 60. The flow space 74 may constitute an annular steam inlet flow space, or it may be used as a hydrocarbon annular flow space.

A further annular flow space 76 is defined between the upstream side of the downstream gas partition wall 66 and the downstream side of the upstream feed assembly wall 62. The flow space 76 constitutes an annular inlet flow space that again may be used for either steam or hydrocarbons.

This configuration provides flow passages through which hydrocarbon gas feed to be cracked and steam for providing cracking heat can each be separately introduced and passed through the flow spaces 74, 76, respectively, to the central axis 52 of the diverging conduit 48. In most cases, the lowermost or upstream flow space 76 will constitute a hydrocarbon cracking feed inlet flow space. The steam feed is more preferably introduced into the uppermost or downstream annular steam inlet flow space 74.

The flow passages 74, 76 are configured so that the different feeds pass through flow spaces to the central axis 52 of the diverging conduit 48 in an inwardly swirling fluid flow pattern within said flow spaces so that the feeds flow about the central axis 52 of the diverging conduit 48.

The walls 60, 62, 66 forming the flow spaces 74, 76 are sized and axially spaced apart to provide the desired volume and flow characteristics for the gases flowing through them. This may be based upon the desired flow rates or linear velocities of each of the feed gases and their relative amounts.

Annular gas manifolds 90, 88 may be provided around the outer periphery of the flow spaces 74, 76, respectively. The gas manifold 88 may be fluidly coupled to a cracking feed source, such as cracking feed 14 of FIG. 1. The manifold 90 may be fluidly coupled to a steam source, such as the steam feed 18 of FIG. 1.

Gas inlets 98, 102 from the manifolds 90, 88, respectively, may be directed tangentially into the flow spaces 74, 76 so that the gases are not directed only radially toward the central axis 52 from the inlets 98, 102, but instead are directed mostly tangentially around the central axis 52 to provide an inwardly swirling flow pattern. Furthermore, the walls 60, 62, 66 forming the different flow spaces of the feed assembly 58 keep the gases introduced from the manifolds 88, 90 from flowing axially along the central axis 52 while they are contained within the flow spaces 74, 76. The manifolds 88, 90 can be configured as standard manifolds (e.g., snail-like) as may be typically used in vortex devices.

Referring again to FIG. 2, the area extending from the central opening 70 of the partition wall 66 to the reactor inlet 56 define a mixing chamber 116. It is here that hydrocarbon cracking feed from the upstream hydrocarbon feed inlet flow space 76 and steam from flow space 74 are discharged into the mixing chamber 116 so that hydrocarbon cracking feed and steam are mixed together and form a swirling gas mixture within the mixing chamber 116. This swirling gas mixture then passes through the diverging conduit 48 and into the reaction chamber 40 of the reactor vessel 36.

Diverters 106, 108 may also be used to provide for changing the angle of attack of the stream flows coming into the mixing chamber 116, typically to add some element of tangential flow.

The gases are introduced and flow through the flow spaces 74, 76 so that the axial velocity (i.e., relative to the axis 52) is controlled in being discharged into the mixing chamber 116. The inlets 98, 100 and/or the orientation of the guide vanes 106, 108 may be set for each flow space 74, 76 so that a selected azimuthal-to-radial velocity for each of the feed streams that flow through the flow spaces 74, 76 is achieved. With respect to the azimuthal-to-radial velocity, in particular embodiments, this may range from 0 to 30 or more, more particularly from 0, 1, or 2 to 3, 4, 5, 6, 7, 8, 9, 10, 11, 12, 13, 14, 15, 16, 17, 18, 19, 20, 21, 22, 23, 24, 25, 26, 27, 28, 29, or 30. In some applications the azimuthal-to-radial velocity may range from 0 to 20, more particularly from 3 to 10. The particular azimuthal-to-radial ratio may vary depending upon the particular reactor configuration and composition of the various streams, however. This is more intimately related to the mixing times and reaction times depending on the flow rates, as well as the composition of the feedstocks used for cracking.

The preheated steam, when mixed with the hydrocarbon feed starting in mixing chamber 116 and flowing up through the reactor chamber 40, provides the heat needed to crack the hydrocarbon. Cracked hydrocarbon products produced in the reactor along with the preheated steam are removed from the reactor vessel 36 through outlet 44, where they may be quenched and further processed and recycled, as discussed with respect to the process steps previously described for FIG. 1.

Figure 3:
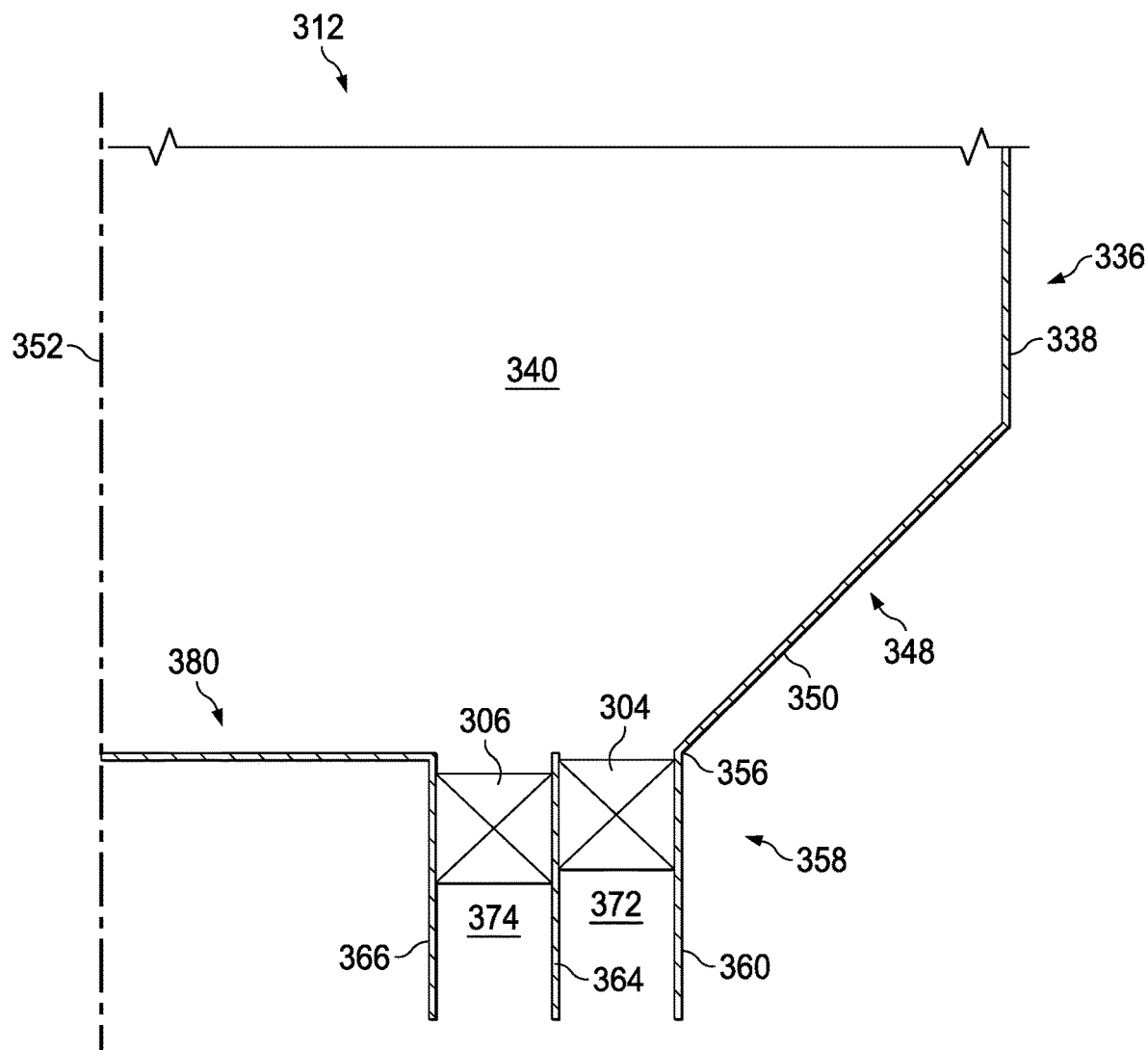
FIG. 3 is a partial schematic representation of an improved lower or upstream portion of the reactor system showing a reactor feed assembly and portion of the reactor, constructed in accordance with particular embodiments of the disclosure.

Referring now to FIG. 3, an elevational cross-sectional schematic representation of a lower portion of one embodiment of the inventive cracking reactor system 312 for cracking of hydrocarbons, such as ethane, LPG, butane, naphtha, natural gas, light gas oils, heavy gas oils, or a combination of these hydrocarbons, is shown. The reactor 312 constitutes an ANJEVOC-C reactor and includes a reactor vessel 336 having a reactor wall 338 that defines an interior reaction chamber 340. The reactor wall 338 may have a cylindrical configuration with a constant diameter along all or a portion of its length, which may constitute a majority of its length. In most instances, the reactor 312 is oriented vertically so that the cylindrical reactor wall 338 is oriented in an upright orientation. The reactor can have other orientations (e.g., horizontal, sloped), however, because the process is controlled by the centrifugal force, which exceeds the gravitational force by several orders of magnitude. The reactor vessel 336 may be configured to provide a length to diameter ratio (L/D) of at least 2. In particular applications, the L/D ratio may range from 2-10.

The reactor vessel 336 may be formed from steel. In certain embodiments, a cooling jacket (not shown) can be provided around the reactor vessel as taught in the prior art. In other embodiments, the reactor wall 338 may be formed from one or more layers of refractory material that line the interior of an outer steel wall to reduce heat loss and sustain the high temperatures of the reactor 312. Or as described elsewhere in this application, because of the unique design and operation of the reactor 312, the reactor wall 338 may be cooled internally by the high-velocity near-wall gas flow pushed by centrifugal forces against the reactor wall 338 so that in some applications no exterior cooling jacket is required. This also allows refractory materials to be used for the interior of the reactor wall 338. Refractory materials (without cooling) typically cannot be used with conventional cracking reactors with pure oxygen due to the higher temperatures (~2800° C.) encountered.

Where the reactor 312 is oriented vertically, a central axis 352 will also be oriented vertically as well and will be concentric with or parallel to a central vertical axis of the reactor vessel 336. In the embodiment shown, the central axis 352 is concentric with and aligned with the central longitudinal axis of the reactor vessel 336.

An outlet (not shown) is provided at the upper or downstream end of the reactor vessel 336 for removing or discharging cracked products from the reaction chamber 340. As used herein, the terms "upstream" and "downstream" or similar expressions with respect to describing various components of the reactor system 312 shall refer to the position of the component with respect to the direction of overall fluid flow through the reactor 312 along the central axis 352. The outlet may be located at the upper end of the reactor vessel 336, or in other embodiments it may be located at the lower end of the reactor vessel 336, so that the flow through the reactor is in the opposite direction (i.e., from top to bottom). The outlet diameter can be the same as the diameter of the reactor wall 338 or the outlet diameter may be reduced to accelerate the flow before quenching and collection downstream.

The reactor 312 further includes a diverging conduit 348. The diverging conduit 348 has a circumferential wall 350 that surrounds the central longitudinal axis 352 of the reactor, the circumferential wall 350 being coupled or joined to the lower or upstream end of the reactor wall 338 of the reactor vessel 336. The circumferential wall 350 extends from opposite upstream and downstream ends of the diverging conduit 348.

As can be seen in FIG. 3, the circumferential wall 350 smoothly expands in width or diameter from the upstream end to the downstream end. The interior of the circumferential wall 350 may have a circular perpendicular transverse cross section (with respect to the axis 352) along its length. The circumferential wall 350 defines an interior flow path of the reactor feed assembly 358. While the diverging conduit 348 is shown in FIG. 3 as a linearly expanding form, it may take other shapes and rates of change of diameter. The overall angle of divergence of the conduit 348 or wall 350 may be the same as that described for reactor 12 of FIG. 2. The downstream end of the diverging conduit 348 joins the reactor wall 338 around its perimeter so that the diverging conduit 348 is in fluid communication with the reactor chamber 340 of the cracking reactor vessel 336. The upstream end of the diverging conduit 348 is connected to the reactor feed assembly 358 of the reactor vessel 336.

The feed assembly 358 includes an outer feed assembly wall 360 that extends circumferentially around and joins the upstream end of the diverging conduit inlet 356. The feed assembly wall 360 is oriented parallel or substantially parallel (i.e., ≤5 degrees from axial about its circumference) to the central axis 352. While only a portion of the reactor 312 is shown, the feed assembly extends concentrically about the entire circumference of the upstream end of the diverging conduit 348.

A gas partition wall 364 is provided between the downstream and upstream ends of the feed assembly. The partition wall 364 is also oriented parallel or substantially parallel (i.e., ≤5 degrees from axial with regard to the central axis) to the central axis 352.

An inner wall 366 is positioned parallel to the partition wall 364, and closer to the central axis 352. The inner wall 366 is also oriented parallel or substantially parallel (i.e., ≤5 degrees from axial about its circumference) to the central axis 352. It is connected to a mixing chamber upstream wall 380. Upstream wall 380 is shown oriented perpendicular or substantially perpendicular (i.e., ≤5 degrees from perpendicular about its circumference) to the central axis 352, though in fact it may be a various other angles that may be of benefit to generating the desired swirling of the gases.

Walls 360, 364 define a first annular gas flow space 372. Likewise, walls 364, 366 define a second annular gas flow space 374. These annular gas flow spaces are utilized to input the two feeds into the reactor, preheated steam and hydrocarbons. Which feed stream goes through which annular gas flow space depends on the preferred conditions inside the reactor 336, such as where to have hotter and colder portions of the gas mix inside the reactor, with respect to the outer wall 338. For instance, hydrocarbons for cracking could enter the reactor via flow space 374 while the superheated steam enters through flow space 372. Such a configuration, with appropriate flow rates, would create a higher heat region inside the reactor 336, with hot reaction gases closer to the reactor wall 338 and relatively colder feedstock closer to the central axis 352. In another preferred embodiment, the two feeds could be reversed. This would cause the hot reaction gases to be in the core of the reactor 336, around the central axis 352, while the colder feedstock gases would be next to the reactor wall 338. Thereby, less heat resistant materials would be needed for the reactor wall 338, lowering the expense of building the reactor 336.

While shown here with two inlets, there can be in fact any number of flow inlets, based on the number of partition walls. Further, these annular gas flow spaces 372, 374 are approximately aligned with the diverging conduit 348 and circumscribe the central axis 352. The annular gas flow spaces 372, 374 each preferably have an annular configuration. Other shapes for the spaces 372, 374 may also be used provided such configuration facilitates the swirling of gases to provide the required flow patterns described herein. This shape may also correspond to the cross-sectional shape of the circumferential wall 350 of the diverging conduit 348. In most applications, however, the flow spaces 372, 374 will be annular in shape. The flow spaces 372, 374 may have a diameter or width that is the same or slightly different than the diameter or width of the diverging conduit 348 at its narrowest point.

Finally, flow spaces 372, 374 further comprises guide vanes 304, 306. Each guide vane 304, 306 can help control the direction of how their respective feed goes into the reactor, preferably to assist in creating a swirling effect, as discussed further infra. Importantly, the direction of the flow spaces 372, 374 along with the guide vanes 304, 306 assure that the gases are not directed only axially along the central axis 352 from the inlets 372, 374, but instead are directed mostly radially and tangentially around the central axis 352 to provide an inwardly swirling flow pattern. The walls 360, 364, 366 forming the flow spaces 372, 374 are arranged to provide the desired volume and flow characteristics for the gases flowing through them. This may be based upon the desired flow rates or linear velocities of each of the feed gases and their relative amounts.

Referring to FIG. 3, in operation, a cracking hydrocarbon feed is introduced into flow space 372. The hydrocarbon feed may be ethane, LPG, butane, naphtha, natural gas, light gas oils, heavy gas oils, or their combinations. While these cracking feed materials are typically introduced as gases, in some instances they may be introduced as liquids. Once introduced as liquids they are rapidly vaporized within the reactor. This may be beneficial in that light and heavy gas oils, for example, are typically vaporized outside the reactor in conventional cracking systems. Such exterior vaporization creates coking issues, however. By injecting them directly into the reactor in liquid form, these issues are avoided. The cracking feed will typically be denser than the heated steam. This is a result of both the high molecular weight of the cracking feed and its density at the selected temperature of the cracking feed. The denser gas/liquids move outward while the lighter cracked products move inward due to very high centrifugal acceleration (100,000-1M g forces). The denser hydrocarbons rapidly mix into the peripheral heated steam at very high temperature due to high swirl.

Preheated steam is introduced into the other gas flow space 374. The introduced steam provides the heat needed to facilitate the actual cracking within the reactor 312. For certain applications (like an example discussed later on), steam may be used in a mass ratio of steam-to-hydrocarbon of 4, or greater.

Such an arrangement again alters the mixing and swirling characteristics inside the reactor compared to that of the reactor of FIG. 2, thereby altering the reaction kinetics and thus the conversion, selectivity and yield coming out of the reactor 312. Determining improved and potentially optimal flow characteristics can be accomplished via experimental tests, or via modern sophisticated modeling tools as is known in the art. Importantly, this illustrates the concept that improvements can be made in the performance of the reactor by varying the angle of the inlet flows of the various components. Indeed, while the various flows are shown in these examples as being either axial, perpendicular, or some of each, any other angles would be acceptable. Importantly, swirling is desired to create the rapid mixing and cracking of the hydrocarbons.

Figure 4:
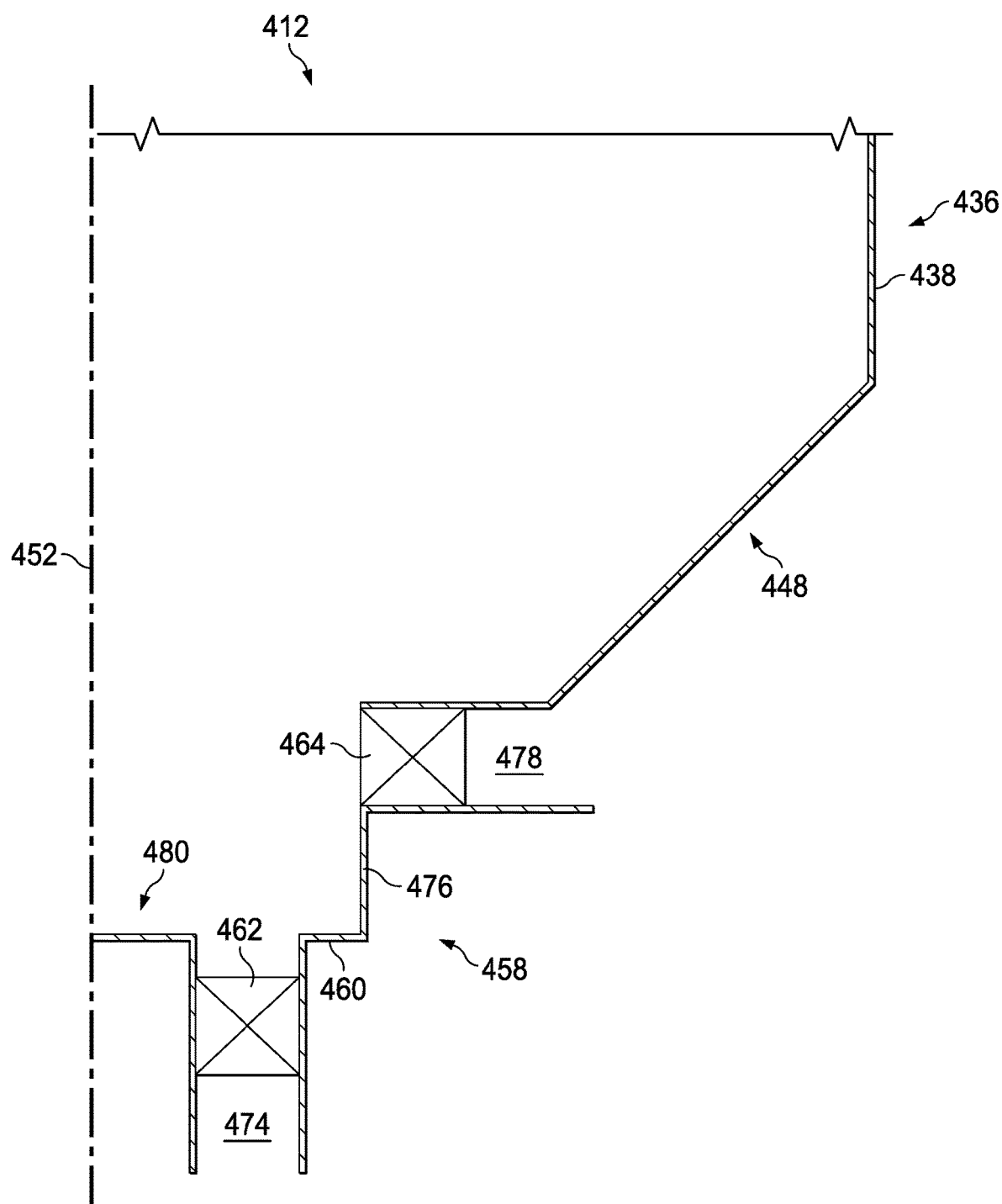
FIG. 4 is partial schematic representation of a lower or upstream portion of the reactor system showing a reactor feed assembly and portion of the reactor, constructed in accordance with particular embodiments of the disclosure.

Referring now to FIG. 4, another embodiment of the disclosure is disclosed. Similar to the embodiment in FIG. 3, the reactor 412 comprises a reactor vessel 436 having a reactor wall 438. A diverging conduit 448 is connected to the reactor wall 438 and may have an angle of divergence that is the same as that previously described. In turn, the diverging conduit 448 is connected to a reactor feed assembly 458. The feed assembly 458 comprises two flow spaces 474, 478. In this embodiment, flow space 478 enters the feed assembly 458 perpendicular to the central axis 452. The remaining flow space 474 still flows into the feed assembly 458 parallel to the central axis. In such a configuration, the hydrocarbon feedstock would enter the feed assembly 458 from flow space 474, while the heated steam stream would enter via flow space 478. In another preferred embodiment, the two feeds could be reversed. Mixing chamber upstream walls 480, 460, 476 may have varying lengths to control possible expansion ahead of actual contact of the flow streams 474, 478.

Flow spaces 474, 478 further comprises guide vanes 462, 464, respectively. Each guide vane 462, 464 can assist in controlling the direction of how their respective feed goes into the reactor, preferably to assist in creating a swirling effect, as discussed further infra. Importantly, the direction of the flow spaces 474, 478 along with the guide vanes 462, 464 assure that the gases are not directed only axial or perpendicular compared to the central axis 452 from the inlets 474, 478, but instead are directed mostly radially and tangentially around the central axis 352 to provide an inwardly swirling flow pattern.

Such an arrangement as shown in FIG. 4 again alters the mixing and swirling characteristics inside the reactor compared to that of the reactor of FIGS. 2 and 3, thereby altering the reaction kinetics and thus the conversion, selectivity and yield coming out of the reactor 412. Determining improved and potentially optimal flow characteristics can be accomplished via experimental tests, or via modern sophisticated modeling tools as is known in the art. Importantly, this illustrates the concept that improvements can be made in the performance of the reactor by varying the angle of the inlet flows of the various combustion components. Indeed, while the various flows are shown in these examples as being either axial, perpendicular, or some of each, any other angles would be acceptable. Importantly, swirling is desired to create the rapid mixing and cracking of the hydrocarbons.

Figure 5:
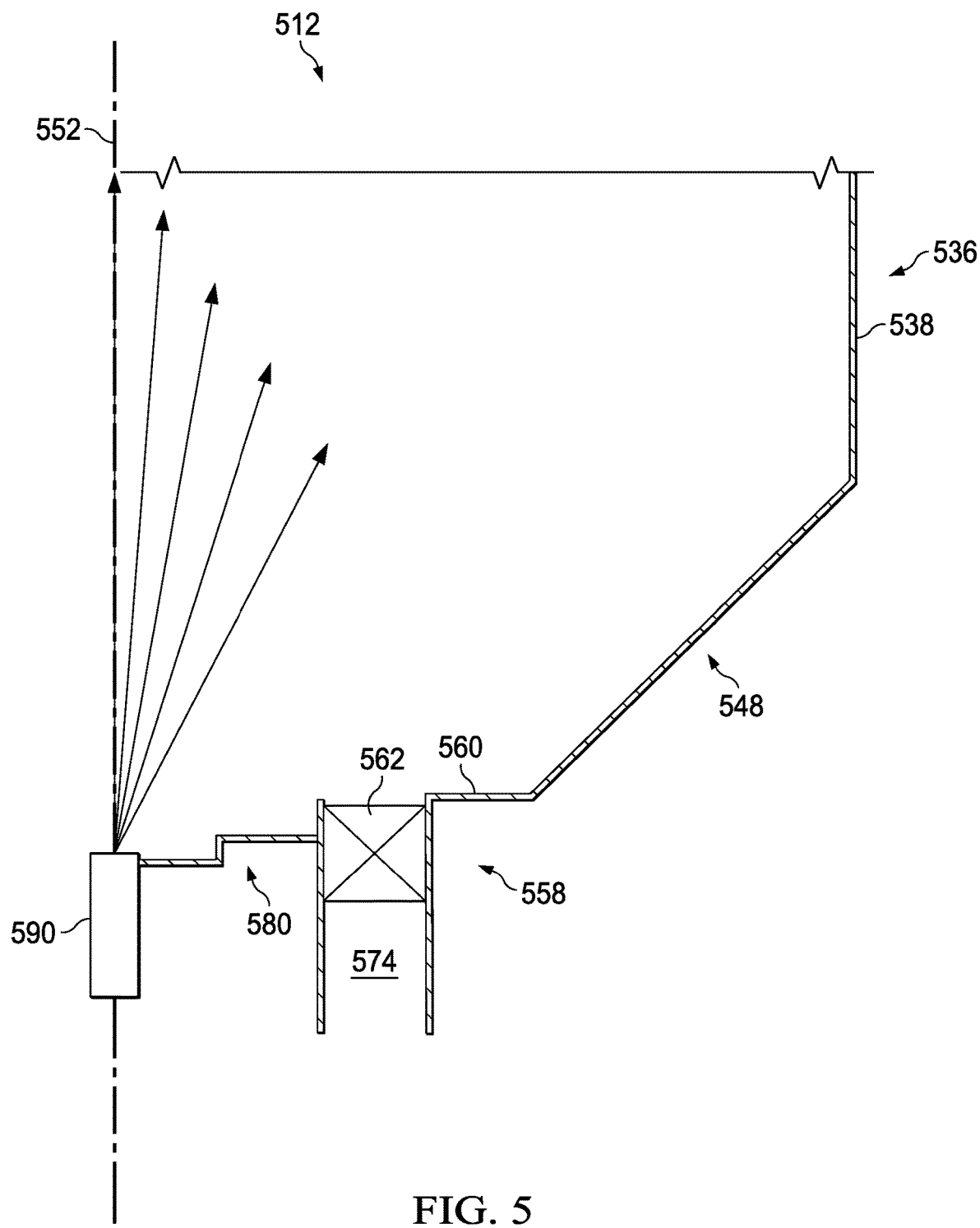
FIG. 5 is partial schematic representation of a lower or upstream portion of the reactor system showing a reactor feed assembly and portion of the reactor, constructed in accordance with particular embodiments of the disclosure.

Referring now to FIG. 5, another embodiment of the disclosure is disclosed. Similar to the embodiments in FIGS. 3 and 4, the reactor 512 comprises a reactor vessel 536 having a reactor wall 538, the reactor wall 538 coupled to a diverging conduit 548 which in turn is connected to a reactor feed assembly 558. In this instance, one flow space 574 enters the feed assembly 558 parallel to the central axis 552. In addition, an atomizer 590 is positioned closer to the central axis 552, compared to the flow space 574, and is also parallel with the central axis 552. In a preferred embodiment, the atomizer 590 is positioned directly in line with the central axis 552. The atomizer 590 is used to inject liquid hydrocarbon feedstocks, while flow spaces 574 is used to inject the preheated steam stream. The flow space 574 further includes a guide vane 562, to allow the flow stream entering via 574 to be angled in various ways, to improve the necessary swirling effects. Mixing chamber upstream walls 580, 560 may have varying lengths to control possible expansion ahead of actual contact of the flow streams 474 and 478. In another preferred embodiment, several atomizers 590 can also be angled slightly off from parallel to the central axis 552 with tangential injection velocity to aid in generating swirling in the mixing.

Again, having the hydrocarbon feed stream most inward means that the outer walls of the reactor vessel 536 will be where the hot reaction gases will be during operation, while the core of the reactor vessel 536 will be cooler due to the hydrocarbon feed stream, entering via the atomizer.

Figure 6:
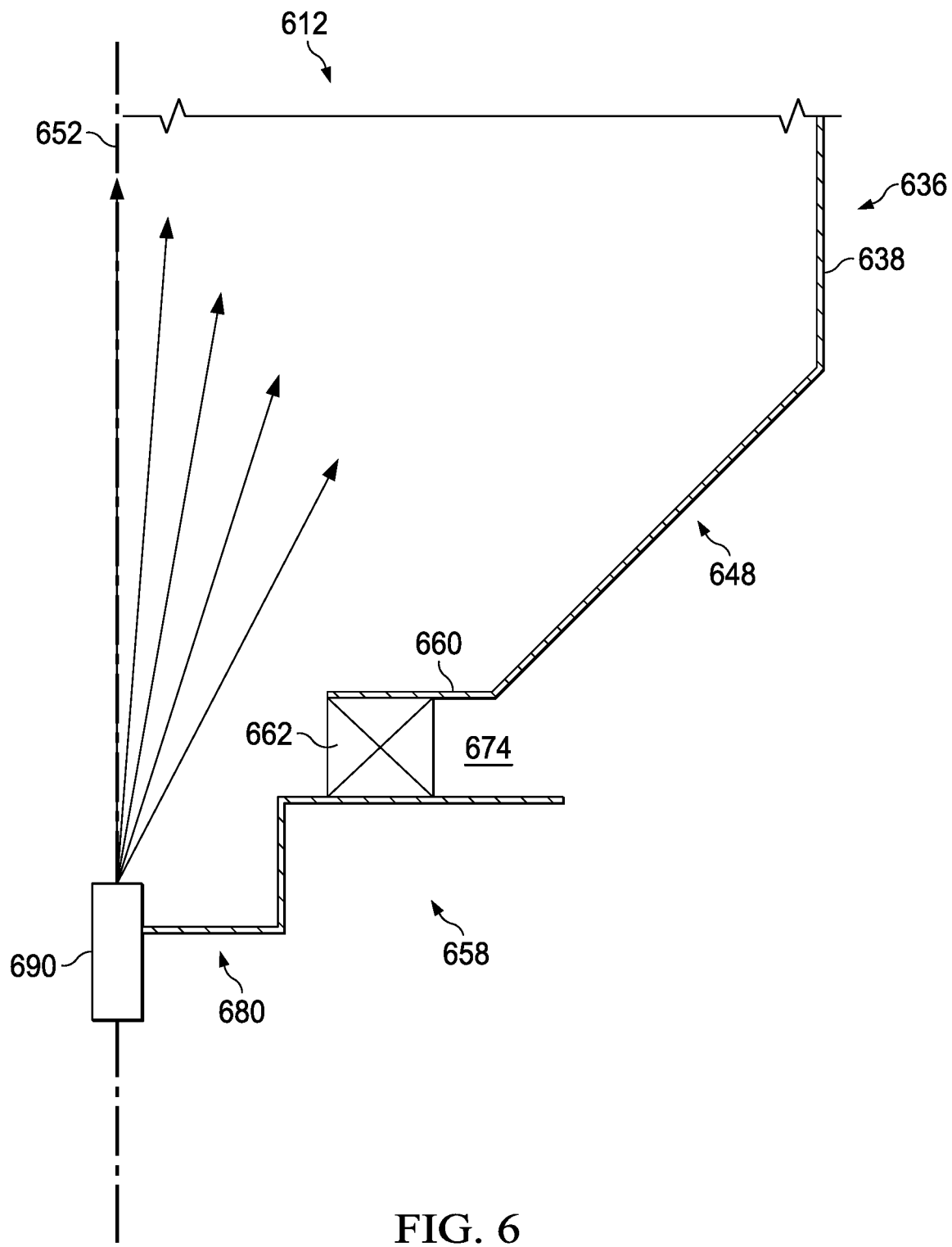
FIG. 6 is partial schematic representation of a lower or upstream portion of the reactor system showing a reactor feed assembly and portion of the reactor, constructed in accordance with particular embodiments of the disclosure.

Referring now to FIG. 6, another embodiment of the disclosure is disclosed. Similar to the embodiments in FIGS. 3, 4 and 5, the reactor 612 comprises a reactor vessel 636 having a reactor wall 638, the reactor wall 638 coupled to a diverging conduit 648 which in turn is connected to a reactor feed assembly 658. In this instance, a flow space 674 enters the feed assembly 658 perpendicular to the central axis 652. In addition, an atomizer 690 is positioned close to the central axis 652, compared to the flow space 674, and is parallel with the central axis 652. In a preferred embodiment, the atomizer 690 is centered with the central axis 652. The atomizer 690 is used to inject liquid hydrocarbon feedstocks, while flow space 674 is used to inject the high temperature steam stream. An inner wall 680 is proximate to the atomizer 690, the inner wall 680 also being perpendicular to the central axis 652 to serve as a bottom wall in the reactor. An inner wall 660 may be place between the entrance of the flow space 674 into the feed assembly 658 and the diverging conduit 648. This inner wall 660 controls how close to the central axis 652 the high temperature steam enters the feed assembly 658.

Again, having the hydrocarbon feed stream most inward means that the outer walls of the reactor vessel 636 will be where the hot reaction gases will be during operation, while the core of the reactor vessel 636 will be cooler due to the hydrocarbon feed stream, entering via the atomizer. And importantly, the direction of the flow space 674 and the atomizer 690, along with the guide vane 662 assure that the gases are not directed only parallel or perpendicular to the central axis 652, but instead are directed mostly radially and tangentially around the central axis 652 to provide an inwardly swirling flow pattern.

In each case, from FIG. 2 to FIG. 6, the volumetric flow rates are controlled to create a swirling pattern inside the reactor, thereby creating a superior reaction, with high yields and conversion. Optimal flow rates for all the various flow streams, along with actual compositional details, and shape of the reactor, are all modeled via software to optimize the results of the reaction. Of note, if one wants to keep the walls relatively cool, then one can use a design as shown if FIG. 3 or 4, and make sure the steam starts more in the middle. If one prefers the coolest part of the reactor chamber to be towards the center, then one can use any of these designs and have the steam start more on the outside portion of the reactor.

The reaction temperature within the reactor and recirculation zone of the present disclosure may range from 900° C. to 1300° C. In particular embodiments, the temperature within the reactor and recirculation zone may range from 1000° C. to 1300° C., more particularly from 1200° C. to 1250° C. In some embodiments, the reactor temperature is higher than what is achieved in conventional cracking reactors, such as tube furnace reactors, which typically operate at 800° C. to 900° C. As discussed earlier, this is due to the temperature limitations of the metallic materials used for such conventional reactors. In the present case, the swirling gas mixture facilitates keeping the walls of the reactor much cooler than in such conventional reactors. The use of such higher temperatures also allow a shorter residence or contact times, thereby resulting in better selectivity and conversion without formation of unwanted products. Operating temperatures for the reactor may be selected to avoid excess production of such unwanted compounds, such as acetylene.

The reactor design described herein features high conversion of the cracking feed and higher selectivity for olefins than other conventional cracking methods. The reactor is relatively simple in configuration, which can significantly reduce the capital and operating costs. The high-swirling gas mixture provides a stable and compact reaction zone, first in the feed assembly then into the main reactor. The reactor walls may be cooled by the swirling hydrocarbon flow against the wall allowing for higher temperatures in the reactor, requiring shorter residence times, so that more desirable products (e.g., ethylene) are produced. Maintaining lower reactor wall temperatures also allows refractory materials to be used in place of metal materials and thus minimizing heat loss.

Because the heated combustion gases are directly mixed with cracking feed in the swirling gas mixture, there is direct gas-gas heat transfer to carry out the cracking reactions. This differs from conventional cracking reactors, such as tube furnaces, which rely on non-direct heat transfer where heat is transferred through the tube walls of the reactor from a separate heating source, such as external combustion gases. Here the process is intensified in that the exothermic step of providing heat from the preheated steam stream to the hydrocarbon feed is immediately combined with the endothermic step of cracking the cracking feed. Thus, energy losses due to heat transfer through reactor walls and equipment, as with conventional systems, are eliminated or minimized. The reactor can be scaled up by increasing feeding rate and dimension scale up.

The streams do not need to be pure, and it is understood that the streams may contain impurities, as can commonly occur, and they may have a potentially negative effect on the results of the reactor. The described reactor will still work in such conditions, though potentially without as great of efficiency.

In some instances, one may add additional streams to generate extra heat. For instance, one could add streams of oxygen and methane to react and generate additional heat.

The following examples serve to further illustrate various embodiments and applications.

EXAMPLES

Example 1

Computational Fluid Dynamics (CFD) simulations with these configurations have been conducted to support the design concept. In one example, inlet steam and ethane were preheated, so that a final mixture temperature of 1500 K was achieved. The following flow rates and temperatures were used for the simulation and are presented in Table 1 below.

TABLE 1

|  |  | Steam | C2H6 |
|---|---|---|---|
| Heat Capacity | J/kg° K | 2300 | 4000 |
| Mass Flow Rate | kg/s | 0.02173913 | 0.005 |
| Initial Temp. | ° K | 1800 | 750 |
| Final Temp. | ° K | 1500 | 1500 |
| Heat Exchange | W | 15,000 | −15,000 |

Figure 7:
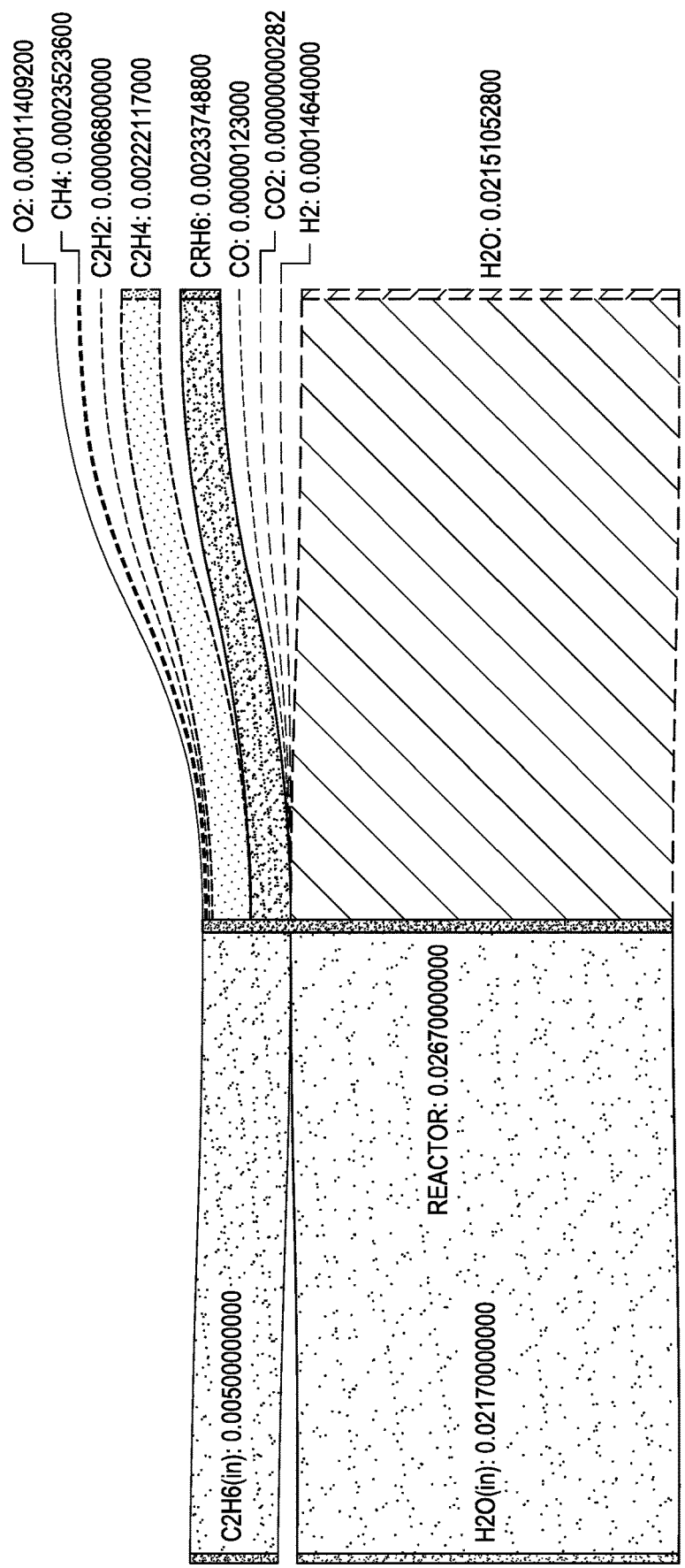
FIG. 7 shows the mass of the process of Example 1.
Figure 8:
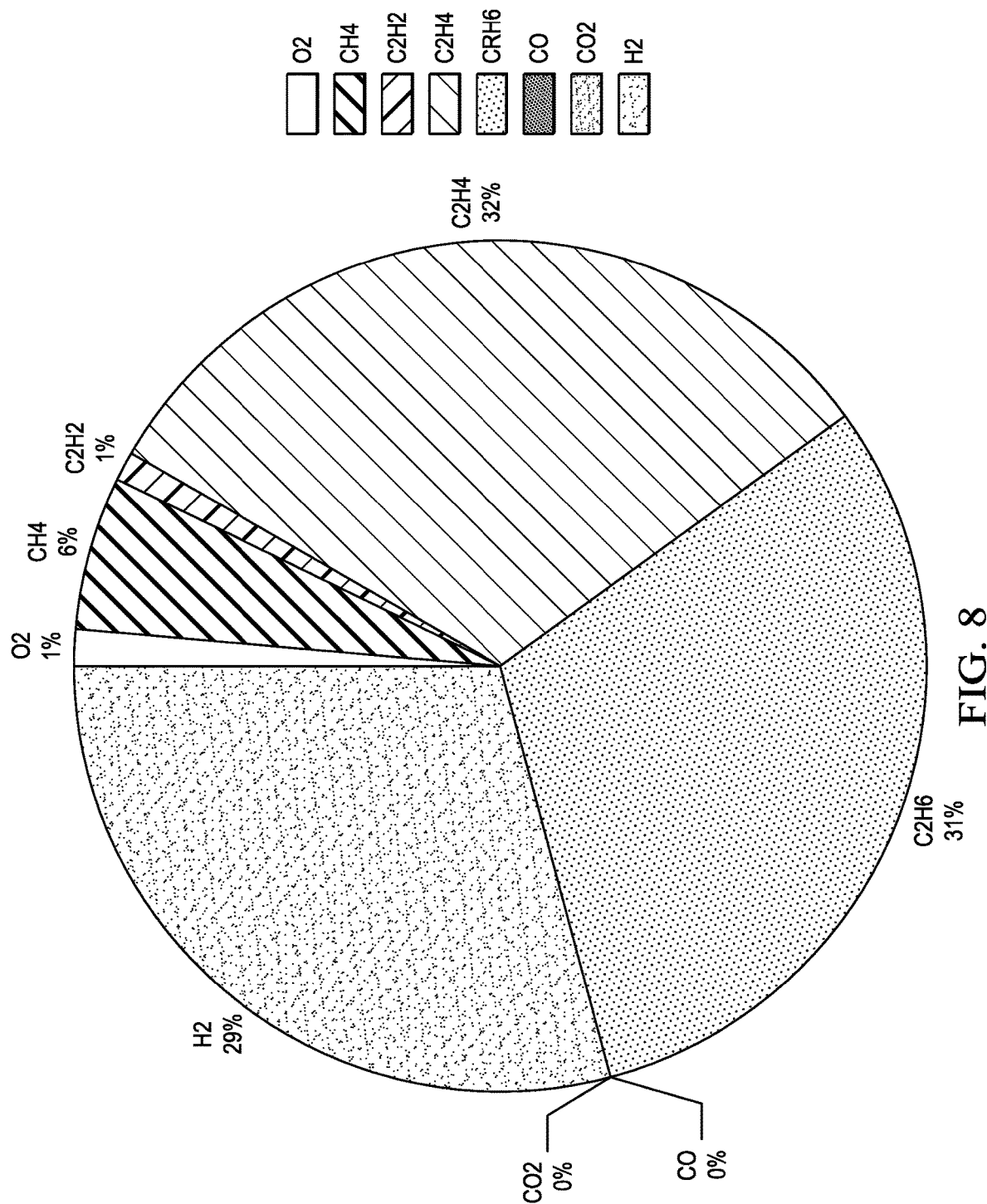
FIG. 8 shows the product gas species mole fraction distribution in Example 1 presented on a dry basis.

FIGS. 7 and 8 show the mass balance of the cracking process, and product gas species mole fraction in dry basis (steam free). In this simulation, ethane conversion was 53.2%. Ethylene and acetylene selectivity was 92.3%, and the yield of ethylene and acetylene was 49.2%.

While the disclosure has been shown in some of its forms, it should be apparent to those skilled in the art that it is not so limited, but is susceptible to various changes and modifications without departing from the scope of the disclosure based on experimental data or other optimizations considering the overall economics of the process. Accordingly, it is appropriate that the appended claims are construed broadly and in a manner consistent with the scope of the disclosure.

We claim:

1. A reactor system for the conversion of hydrocarbons, the reactor system comprising:
   a reactor vessel having a reactor wall that defines a reaction chamber, the reaction chamber having a central longitudinal axis, the reactor vessel having an upstream end and a downstream end;
   a diverging conduit having an upstream end, a downstream end, and a circumferential wall expanding in width from the upstream end to the downstream end of the diverging conduit, the downstream end of the diverging conduit being in fluid communication with the reaction chamber of the reactor;
   a feed assembly having an upstream end and a downstream end the downstream end of the feed assembly being operably coupled to the upstream end of the diverging conduit, with the central longitudinal axis passing through the feed assembly, the feed assembly comprising at least two flow inlets, wherein the two flow inlets provide a flow path for at least one each for heated gas and hydrocarbons, respectively;
   wherein the flow inlets are configured to respectively receive the heated gas and hydrocarbon, and to cause the heated gas and hydrocarbon to mix together to form a swirling mixture as the heated gas and hydrocarbon flow from the feed assembly through the diverging conduit and into the reaction chamber;
   wherein the flow inlets are configured to receive the heated gas preheated before entering the flow inlets;
   wherein the reaction chamber is configured such that:
      the heat required for cracking the hydrocarbon in the reaction chamber primarily comes from the thermal energy in the heated gas, and,
      the reaction in the reaction chamber creates an exit stream comprising heated gas, hydrocarbon, and reaction products,
   wherein at least one flow inlet causes its respective feed stream to enter the reactor in a direction that is approximately parallel to the central longitudinal axis, and at least one inlet flow space causes its respective feed stream to enter the reactor in a direction that is approximately perpendicular to the central longitudinal axis, with at least one feed stream having a tangential-to-radial or tangential-to-axial velocity component to form a swirling flow for mixing in the mixing feed streams.

2. The reactor system of claim 1, wherein the feed assembly further comprises guide vanes, the guide vanes being movable to selected positions to provide selected tangential-to-radial or tangential-to-axial velocity ratios of feed streams for mixing in the mixing feed streams.

3. The reactor system of claim 1, wherein the reaction chamber further comprises an outlet, through which the hydrocarbons and reaction products exit the reaction chamber.

4. The reactor system of claim 1, wherein after the heated gas, hydrocarbon and reaction products exit the reaction chamber, the heated gas is separated from the rest of the exit stream.

5. The reactor system of claim 4, wherein the separated heated gas is recycled back to a front of the reactor system.

6. The reactor system of claim 5, further comprising a swirl atomizer configured to induce swirling in the mixing feed streams.

7. The reactor system of claim 1, wherein the heated gas is preheated via renewable energy sources.

8. The reactor system of claim 1, wherein at least one of the flow inlets is an atomizer, the atomizer providing a flow path for the hydrocarbon.

9. The reactor system of claim 8, wherein the hydrocarbons coming in via the atomizer is naphtha, crude oil, pyoil from hydrocarbons, biomass, or plastic waste, or NGL in liquid phase.

10. The reactor system of claim 1, wherein the reaction chamber has an outer wall, and wherein the selection and placement of the one or more flow inlets allows one to control the placement of the hydrocarbon with respect to the heated gas, the placement creating a cooled space in the interior of the reactor.

11. The reactor system of claim 10, wherein the hydrocarbon first enters the reactor closest to the outer wall of the reactor, and then moves radially inward to interact with the heated gas.

12. The reactor system of claim 10, wherein the hydrocarbon first enters the reactor closest to the central longitudinal axis of the reactor, and then moves radially outward to interact with the heated gas.

13. The reactor system of claim 1, wherein the reactor system further comprises a converging conduit, the converging conduit having an upstream and downstream end, the central longitudinal axis passing through the converging conduit, the converging conduit being connected to the upstream end of the diverging conduit, and the upstream end of the feed assembly.

14. The reactor system of claim 13, wherein the converging conduit and the diverging conduit together comprise a venturi.

15. The reactor system of claim 1, wherein the heated gas is steam.

16. The reactor system of claim 1, wherein the heated gas or the hydrocarbons contain impurities.

* * * * *